(No Model.) 2 Sheets—Sheet 2.
G. J. CHAPMAN.
VELOCIPEDE.
No. 391,882. Patented Oct. 30, 1888.
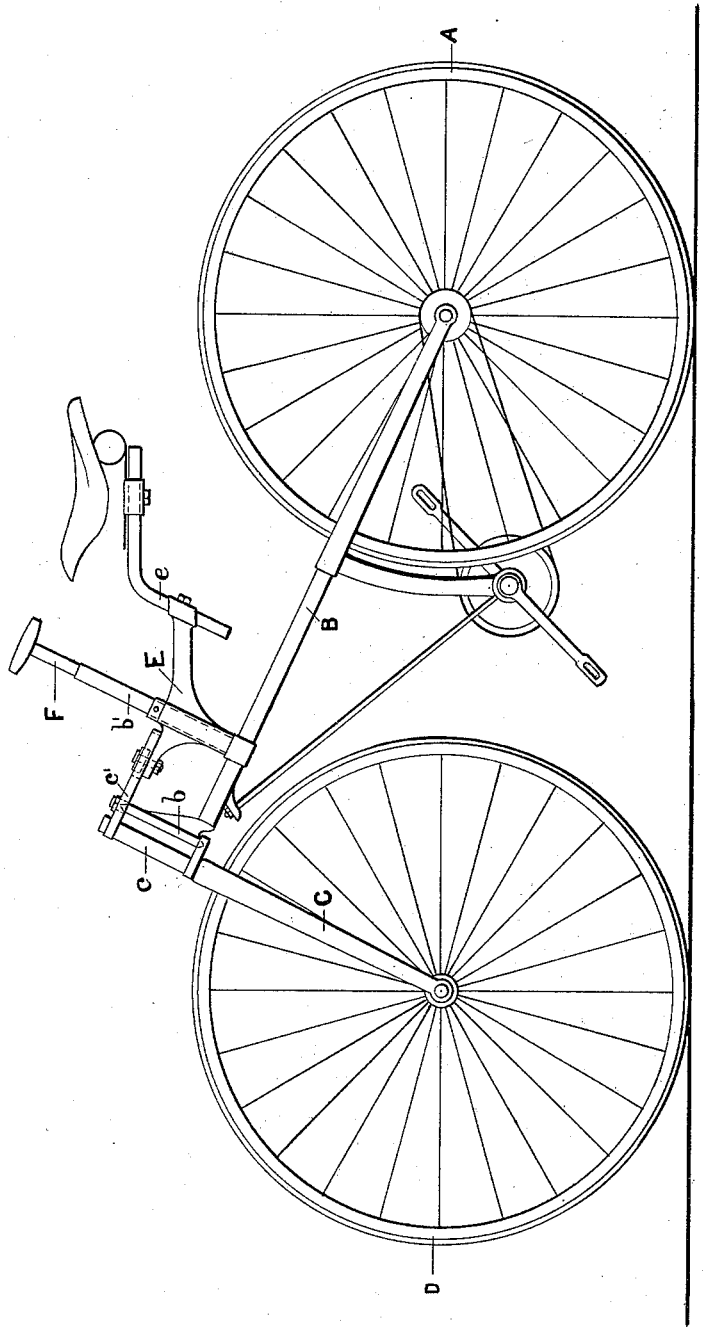
WITNESSES:
Arthur M. Black.
Thos. H. Williams.
INVENTOR.
George James Chapman.
By his Attorney,
Robt. Ed. Phillips.

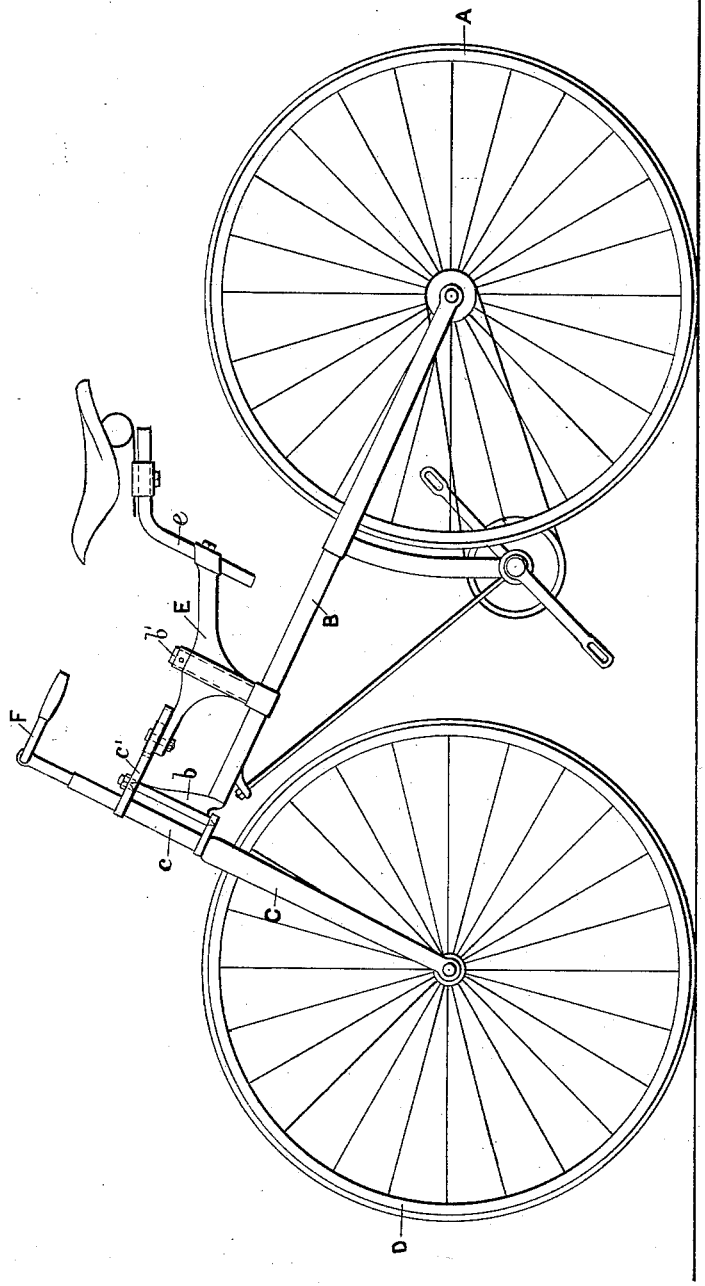

United States Patent Office.

GEORGE JAMES CHAPMAN, OF TOTTENHAM, COUNTY OF MIDDLESEX, ENGLAND.

VELOCIPEDE.

SPECIFICATION forming part of Letters Patent No. 391,882, dated October 30, 1888.

Application filed August 18, 1888. Serial No. 283,150. (No model.) Patented in England December 30, 1887, No. 17,928.

*To all whom it may concern:*

Be it known that I, GEORGE JAMES CHAPMAN, a subject of the Queen of Great Britain, residing at London, in the county of Middlesex, England, have invented certain new and useful Improvements in Velocipedes, (for which I have obtained a patent in Great Britain, No. 17,928, bearing date December 30, 1887,) of which the following is a specification.

My invention relates to improvements in velocipedes in which the steering wheel or wheels are placed in front of the driving-wheel or wheels, and the object of my improvement is to control the action of the steering wheel or wheels, and consequently the steering or guiding of the machine, either wholly or partially without the use of the hands. I attain this object by the mechanism illustrated in the accompanying drawings, in which—

Figure 1, Sheet No. 1, is a view of a rear-driving bicycle in side elevation, embodying my invention; and Fig. 2, Sheet No. 2, is a view in side elevation of a modification thereof.

Throughout these views similar parts are marked with like letters of reference.

The driving-wheel A is mounted in a frame, B, of the usual type, terminating at its forward extremity in a neck or socket, b, adapted to engage with the head or steering post c of the fork C, carrying the steering-wheel D. The frame B carries the pedal-crank axle, which is fitted in the usual manner, and is connected to the driving-wheel A or axle thereof by chain or any other gearing. On the forward part of the frame B is pivoted on a pin or centers, b', a rocking lever, E, the rear end of which is adapted to receive a pillar, e, carrying a saddle and spring of the usual type. The forward end of the rocking lever E is connected to an arm or lever, c', fixed to or forming part of the head or post c of the fork C, carrying the steering-wheel D, by a rotating and sliding block and slot, or by toothed quadrants, or by any other suitable device, so that the motion of the arm or lever c' produces a reversed motion at the rear end of the rocking lever E carrying the saddle. The lengths of the arms of the rocking lever E and of the arm or lever c' may be varied as desired to give the best results in steering.

The handle-bar F may either be mounted on the extension of the head or post c, as illustrated by Fig. 1, whereby it may be used to assist in controlling the steering-wheel, or on the frame B, as illustrated by Fig. 2.

Those parts to which no special reference has been made and which are not illustrated in the accompanying drawings present no novel features and may be of the usual type and construction.

It will be seen that by the use of the rocking lever or its equivalent and the secondary socket or centers the saddle and front steering-wheel are caused to deflect in unison toward the same side, thus giving the rider perfect control over the steering of the machine without the use of his hands, and insuring his safety by causing the center of gravity to move toward the center of the path of motion of the machine when it is running in a curved path.

Although my invention is hereinbefore described and shown as applied to a rear-driving bicycle, it is also applicable to all other types of cycles driven by the rear wheel or wheels and steered by the front wheel or wheels.

I am aware that prior to my invention the saddles of velocipedes have been mounted so as to indirectly control the steering wheel or wheels of velocipedes. I therefore do not claim such an arrangement broadly.

What I do claim as my invention, and desire to secure by Letters Patent, is—

1. In a velocipede, the combination, with the steering wheel or wheels mounted in a fork or its equivalent pivoted to the main frame of the machine by the usual head or socket, of a rocking lever pivoted in the rear of the head or socket on which the steering wheel or wheels turn, and carrying the seat or saddle at one end, and connected with the steering head or socket at the other, as and for the purpose set forth.

2. In a rear-driving velocipede, mounting the saddle on a rocking lever pivoted in the rear of the center on which the steering wheel or wheels turn, and connecting it with the said center, so that the saddle and steering wheel or wheels deflect together toward the same side of the machine in the act of steering, as and for the purpose set forth.

3. In a rear-driving velocipede, the combination, with the steering wheel or wheels mounted in a fork or its equivalent pivoted to the main frame of the machine by the usual head or socket and prolonged upward to carry a transverse handle-bar, of a rocking lever pivoted on the main frame of the machine in the rear of the head or socket on which the steering wheel or wheels turn, and carrying the seat or saddle at the rear end, and connected with the steering head or fork at the front end, as and for the purpose set forth.

4. In a rear-driving velocipede, the combination of the arm or lever $c'$, fixed to or forming part of the head $c$ of the fork C, carrying the steering-wheel D, the rocking lever E, pivoted on a pin, $b'$, or its equivalent, mounted on the frame B, carrying the driving wheel A, the seat-pillar $e$, mounted on the rear end of the rocking lever E, and the handle-bar F, fixed to the frame B, all combined, arranged, and operating as and for the purpose set forth.

In witness whereof I have hereunto signed my name in the presence of two subscribing witnesses.

GEORGE JAMES CHAPMAN.

Witnesses:
ROBT. ED. PHILLIPS,
ARTHUR M. FLACK.